(12) United States Patent
Zhang

(10) Patent No.: US 12,470,473 B2
(45) Date of Patent: Nov. 11, 2025

(54) ROUTING BASED ON HIERARCHICAL DOMAINS IN A NETWORK ENVIRONMENT

(71) Applicant: Cisco Technology, Inc., San Jose, CA (US)

(72) Inventor: Randy H. Zhang, Manassas, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 349 days.

(21) Appl. No.: 17/897,602

(22) Filed: Aug. 29, 2022

(65) Prior Publication Data

US 2024/0073120 A1    Feb. 29, 2024

(51) Int. Cl.
*H04L 45/02* (2022.01)
*H04L 45/74* (2022.01)

(52) U.S. Cl.
CPC .............. *H04L 45/04* (2013.01); *H04L 45/74* (2013.01)

(58) Field of Classification Search
CPC .. H04L 45/04; H04L 63/0209; H04L 63/0227
See application file for complete search history.

(56) References Cited

U.S. PATENT DOCUMENTS

| | | | |
|---|---|---|---|
| 11,159,419 B1* | 10/2021 | Roersma | H04L 63/0281 |
| 2003/0169689 A1* | 9/2003 | Chavali | H04L 45/04 |
| | | | 370/230.1 |
| 2013/0275608 A1 | 10/2013 | Tan et al. | |
| 2014/0185614 A1* | 7/2014 | Hunter | H04L 45/74 |
| | | | 370/392 |
| 2014/0376409 A1* | 12/2014 | Lee | H04L 45/03 |
| | | | 370/255 |
| 2015/0341310 A1* | 11/2015 | You | H04L 61/5007 |
| | | | 709/245 |
| 2016/0080245 A1* | 3/2016 | Fang | H04L 45/04 |
| | | | 370/392 |
| 2019/0116063 A1* | 4/2019 | Bottorff | H04L 47/2483 |
| 2020/0112542 A1 | 4/2020 | Mosko | |
| 2020/0380152 A1 | 12/2020 | Shriver et al. | |
| 2022/0247666 A1* | 8/2022 | Roersma | H04L 41/0803 |

FOREIGN PATENT DOCUMENTS

WO    2021/036707 A1    3/2021

OTHER PUBLICATIONS

Network Working Group, Request for Comments: 4271, A Border Gateway Protocol 4 (Year: 2006).*

(Continued)

*Primary Examiner* — Ayaz R Sheikh
*Assistant Examiner* — Christopher R Davis
(74) *Attorney, Agent, or Firm* — Edell, Shapiro & Finnan, LLC

(57) ABSTRACT

In one example, a network device within a network domain determines routing information to exchange in a network. The network domain corresponds to an actual entity and includes a structure with a plurality of domains arranged in hierarchical levels corresponding to a hierarchy of entities of the actual entity. The routing information indicates at least one domain and hierarchical level of the structure. The network device exchanges the routing information in the network to control routing through the entities of the actual entity.

20 Claims, 9 Drawing Sheets

(56) References Cited

OTHER PUBLICATIONS

Network Working Group, Request for Comments: 5065, Autonomous System Confederations for BGP (Year: 2007).*
Internet Engineering Task Force (IETF), Request for Comments: 7454, BGP Operations and Security (Year: 2015).*
Li et al., "Co-governed Sovereignty Network—Legal Basis and Its Prototype & Applications with MIN Architecture," https://link.springer.com/book/10.1007/978-981-16-2670-8, Jul. 2021, 284 pages.

* cited by examiner

ROUTING BASED ON HIERARCHICAL DOMAINS IN A NETWORK ENVIRONMENT

TECHNICAL FIELD

The present disclosure relates to routing based on hierarchical domains in a network environment. A communication protocol is employed at a network layer that enables configuration, reporting, tracking, and filtering of routing information exchanges in the network environment based on the hierarchical domains.

BACKGROUND

Internet Protocol (IP) routing and forwarding operations do not populate, track, filter, or consider localization and sovereign domains, thereby rendering data residence, privacy, and localization compliance at a network infrastructure layer challenging. Data sovereignty requirements arise from data that is in transit and data that is at rest (or stored). Compliance of data sovereignty requirements for stored data is performed by an application layer. However, there is inadequate capability for a network infrastructure layer to provide and monitor compliance with data sovereignty requirements for data during transit.

DESCRIPTION OF EMBODIMENTS

Overview

Figure 1:
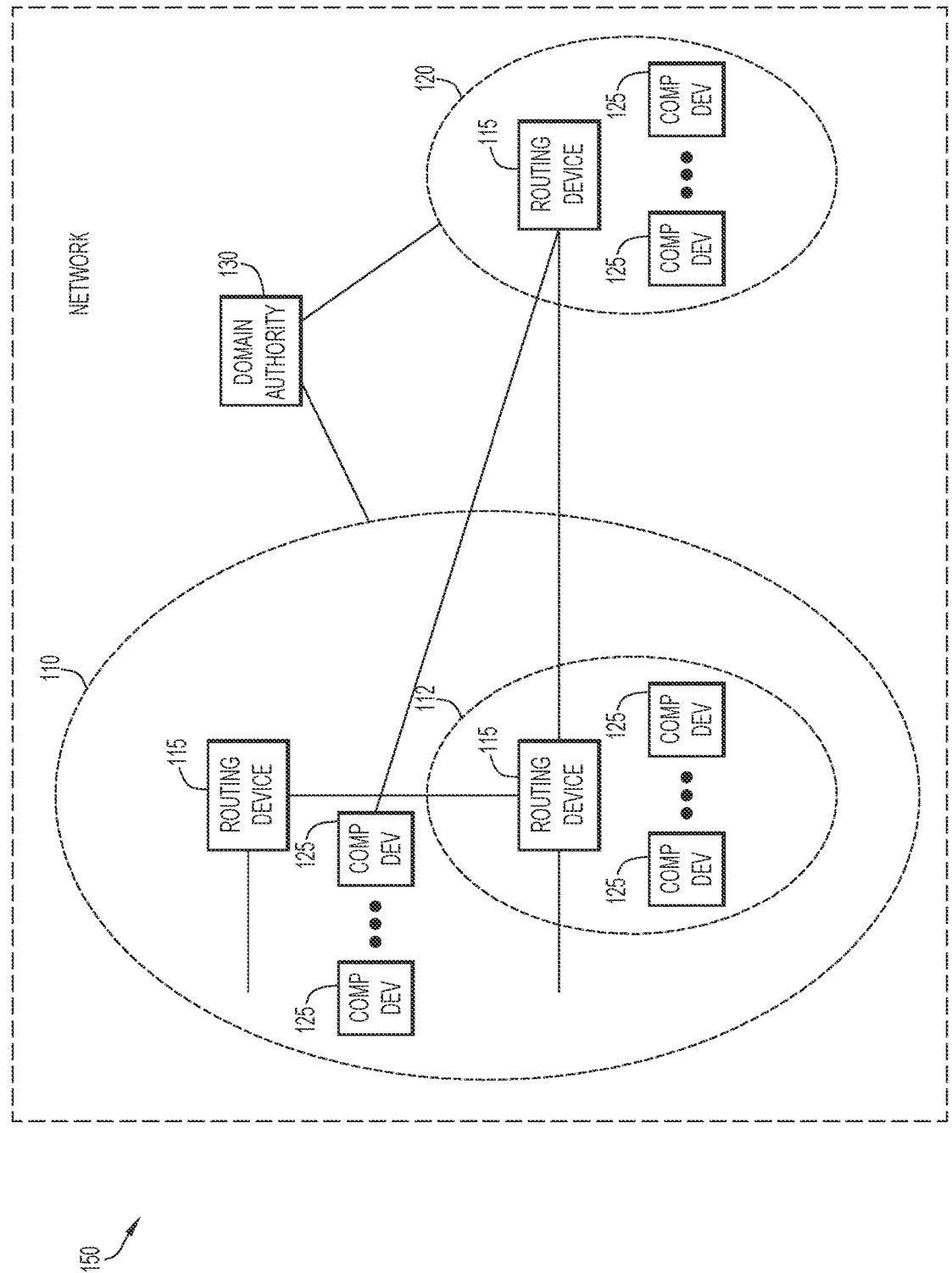
FIG. 1 illustrates a block diagram of a network environment including hierarchical domains, according to an example embodiment.

In one example embodiment, a network device within a network domain determines routing information to exchange in a network. The network domain corresponds to an actual entity and includes a structure with a plurality of domains arranged in hierarchical levels corresponding to a hierarchy of entities of the actual entity. The routing information indicates at least one domain and hierarchical level of the structure. The network device exchanges the routing information in the network to control routing through the entities of the actual entity.

EXAMPLE EMBODIMENTS

Internet Protocol (IP) routing and forwarding operations do not populate, track, filter, or consider localization and sovereign domains, thereby rendering data residence, privacy, and localization compliance at a network infrastructure layer challenging. Data sovereignty requirements arise from data that is in transit and data that is at rest (or stored). Compliance of data sovereignty requirements for data storage and replication are performed by an application layer.

However, there is inadequate capability for a network infrastructure layer to provide and monitor compliance with data sovereignty requirements for data during transit. Current approaches have several disadvantages with respect to various scenarios. For example, some network traffic of an initial country may actually be routed through another country prior to being delivered to a destination in the initial country. Consequently, this network traffic is exposed to monitoring and tracking by the other country. An example embodiment enables identification of a route through a particular country or region. The example embodiment uses sovereign domain information for a route to enable removal or avoidance of network traffic that traverses another country or region in accordance with government or organizational data sovereignty compliance requirements.

The Border Gateway Protocol (BGP) is an inter-domain routing protocol that introduces a concept of administrative domains by organizing networks into a set of self-administered autonomous systems (AS) with extensive policy controls. However, since these autonomous systems (AS) do not necessarily align/overlap with sovereign domains, BGP cannot adequately satisfy the data sovereignty requirements. For example, an autonomous system (AS) may cross a country or region boundary, where controlling updates for data sovereignty purposes is extremely complex. In other words, at the highest country/region level, there is not a unique autonomous system (AS) to represent that country/region. Thus, it is difficult for BGP to filter or block network traffic from a country on the global Internet. An example embodiment enables routes to be restricted from traversing a country, and utilizes country level sovereign domain information to control routing information with less complexity.

Further, the Border Gateway Protocol (BGP) provides confederation to scale/hide private autonomous systems (AS). However, the autonomous systems (AS) on the public Internet are arranged in a flat construct, while sovereign domains are inherently hierarchical in nature (e.g., a state or province is under the sovereignty of a country). In other words, BGP is ill-suited for handling the hierarchical nature of sovereign or other domains because the Internet has a globally flat (non-hierarchical) autonomous system (AS) structure. An example embodiment accommodates hierarchical sovereign or other domains and provides built-in hierarchy support.

A transit path may be required to traverse specific countries/regions, exclude certain countries/regions, or traverse a specific set of domains, while in other instances transit path audit/reporting is needed to ensure data sovereignty compliance. An example embodiment controls a data transit path for data sovereignty compliance. The example embodiment utilizes sovereign domain information to control routing and monitor data sovereignty compliance.

During a path selection process where multiple paths exist, a path may be preferred over other paths because of data sovereignty requirements. An example embodiment enables a path to be selected or avoided for data sovereignty compliance.

Moreover, various approaches are available to restrict data flows at a network infrastructure layer, such as use of private non-routable addresses, a firewall, and address translation. These approaches are performed at the Internet Protocol (IP) prefix level which provide good flexibility, but also increase administration complexity. The Border Gateway Protocol (BGP) provides ways for routing information control at the enterprise level when the boundary aligns with an enterprise boundary. An example embodiment provides routing information control through a hierarchical domain structure, and allows proper and explicit control at an enterprise boundary.

In addition, a Transmission Control Protocol (TCP) proxy has been used at a network infrastructure layer to perform data direction for a data localization purpose. When a user requests data that has a localization requirement, a TCP session can be re-directed to an appropriate server that satisfies the localization requirement. However, this addresses data in transit and data at rest localization compliance on a data forwarding plane. In contrast, an example embodiment addresses routing information control with explicit sovereign domain controls with respect to a control plane.

An example embodiment enables routing based on hierarchical domains in a network environment. A communication protocol is employed at a network layer to enable configuration, reporting, tracking, and filtering of routing information exchanges in the network environment based on the hierarchical domains. The communication protocol employs a hierarchical construct of domain identifiers (e.g., numbering, etc.) to enable proper alignment of the hierarchical domains with corresponding real-world (e.g., physical or actual) hierarchical entities (e.g., countries, organizations or enterprises, etc.). This capability is inherently provided by a hierarchical data structure for the domain identifiers that allows for additional hierarchy, and helps simplify and scale data sovereignty compliance requirements. In addition, scalability is enhanced by enabling introduction of additional hierarchy as needed, such as in a large country or region. When a domain grows in size, further hierarchy may be leveraged. Scalability features (e.g., reflection and confederation) of the Border Gateway Protocol (BGP) may also be used by an example embodiment to enlarge a domain.

In an example embodiment, the communication protocol advertises and updates Internet Protocol (IP) prefixes on the IP-based Internet with entity (e.g., sovereignty) identity. The communication protocol encodes entity identity information, including a complete trace (e.g., with an originator) of entity and child or sub-entity domains that an IP prefix has traversed from the originator. The communication protocol also provides a set of policies for a routing device of a domain to control a path of a route through the network environment for data sovereignty compliance or other purposes. The communication protocol provides inherent support for hierarchical entities, such as sovereignties.

A domain for an entity (or entity domain) may be associated with any type of real-world (e.g., physical or actual) or other entity (e.g., country or other sovereignty, organization or enterprise, region, a group of devices, people or other items, etc.). The entity domain may include any network domains arranged in a hierarchical (e.g., parent-child, etc.) or other type of relationship corresponding to a hierarchical or other structure of a real-world (e.g., physical or actual) or other entity (e.g., country or other sovereignty, organization or enterprise, region, a group of devices, people or other items, etc.). A hierarchy of an entity domain may include one or more hierarchical levels or tiers of network domains (e.g., a top level and any quantity of child or subordinate levels, etc.). For example, an entity domain may include a top level with a primary network domain representing the entity, and any quantity of child levels with secondary domains representing child entities (or sub-entities) within the entity. The primary and secondary network domains align (geographically or otherwise) with the boundaries of the real-world (e.g., physical or actual) or other entity and corresponding child entities (or sub-entities) to track and control network traffic though the entities and child entities (or sub-entities). An example embodiment may enable network traffic to traverse or bypass the entity or certain child entities (or sub-entities).

By way of example, an entity domain may correspond to a real-world (e.g., physical or actual) sovereignty (e.g., country, etc.), and include network domains arranged in a hierarchical type relationship corresponding to the real-world sovereignty. For example, the entity domain may include a top level with a primary network domain representing the sovereignty (e.g., country, etc.), and any quantity of child levels with secondary network domains representing child sovereignties (or sub-sovereignties) within the sovereignty (e.g., state, city, town, neighborhood, etc.). In this case, the primary and secondary network domains align geographically with the boundaries of the real-world sovereignty and child sovereignties to track and control network traffic though the sovereignties and child sovereignties (e.g., country, state, city, town, neighborhood, region, etc.) for data sovereignty compliance or other purposes. An example embodiment may enable network traffic to traverse or bypass the sovereignty or certain sub-sovereignties.

Further, an entity domain may correspond to a real-world (e.g., physical or actual) organization, and include network domains arranged in a hierarchical type relationship corresponding to the real-world organization. For example, the entity domain may include a top level or primary network domain representing the organization, and any quantity of child levels or secondary network domains representing units within the organization (e.g., division within the organization, department or group within a division, etc.). In this case, the primary and secondary network domains align with the boundaries of the real-world organization and units (e.g., geographic, network or other boundaries of device groups, etc.) to track and control network traffic though the organization and units (e.g., organization, division, department or group, etc.) for data compliance or other purposes. An example embodiment may enable network traffic to traverse or bypass the organization or certain units.

Networking devices and network prefixes (e.g., for Internet Protocol (IP) or other network addresses, etc.) are associated with an entity domain. Routes originated from or transited through that domain can be tracked and filtered. A network environment 150 including hierarchical domains according to an example embodiment is illustrated in FIG. 1. Network environment or network 150 includes entity domains 110, 120, one or more routing devices 115, one or more computing devices 125, and one or more domain authorities 130. The entity domains, routing devices, computing devices, and domain authorities preferably communicate over the network. Entity domains 110, 120 may correspond to, or be aligned with, boundaries of any real-world (e.g., physical or actual) or other entities (e.g., country, state, organization, etc.). By way of example, entity domain 110 includes a child domain 112 with each of entity domain 110 and child domain 112 including a corresponding routing device 115 and one or more computing devices 125. Entity domain 120 has no child domains, and includes a corresponding routing device 115 and one or more computing devices 125. Routing devices 115 are preferably disposed or located toward a border of a corresponding domain to control network traffic entering and leaving that domain. However, network environment 150 may include any quantity of entity domains, child domains, routing devices, computing devices, and domain authorities located and/or arranged in any fashion, where the entity and child domains may include any quantity of child domains (e.g., in a nested fashion, etc.). Computing devices 125 may include any networking and/or computer devices (e.g., router, switch, hub, node, laptop, desktop, smartphone, or other processing devices, etc.).

Routing devices 115 control routing information exchanges by implementing a communication protocol in accordance with an example embodiment. The communication protocol preferably pertains to a control plane aspect relating to exchange and filtering of routing information that is entity domain aware (e.g., aware of sovereignties or other entities, etc.). Routing devices 115 understand and exchange entity domain aware routing information among themselves. Neighbor, advertisement, routing, and/or other policies may be configured for each routing device 115 to filter routing information and/or traffic pursuant to data requirements.

Domain authorities 130 manage and verify entity and child entity domains (or domain identifiers). The domain authorities may be hierarchical and correspond to hierarchical levels of the entity domains (or domain identifiers). Routing devices 115 preferably authenticate each other, where the entity domains may be validated by the domain authorities to perform source verification.

The network domains of an entity domain (e.g., primary domain, secondary domains, etc.) may each be associated with a domain identifier. In order to allow grouping and scalability, a hierarchy is built into a structure of the domain identifier. Initially, each network domain of the entity domain is assigned a local or relative domain identifier that uniquely identifies the network domain within a context or level of a domain hierarchy for the entity domain (e.g., similar to a relative address). The local domain identifier preferably includes a numeric value or number. The domain identifier includes one or more local domain identifiers corresponding to domains of the domain hierarchy for the entity domain in order to represent a position of a corresponding network domain in the domain hierarchy. The domain identifier for a network domain may be represented as a path in the domain hierarchy for the entity domain, and basically combines or concatenates (e.g., in a parent-child relationship) the local domain identifiers of any parent domains of the network domain. This provides a universally unique domain identifier (within network 150) for a network domain (e.g., similar to an absolute address), even though child domains of different parent domains may have the same local domain identifiers. A delimiter (e.g., period or dot, slash, etc.) may be placed between the local domain identifiers to provide a representation (or notation) that indicates the different levels of the domain hierarchy. However, the domain identifier and local domain identifier may include any quantity of any type of indicators to indicate a corresponding domain (e.g., alphanumeric, name, number, etc.).

Figure 2:
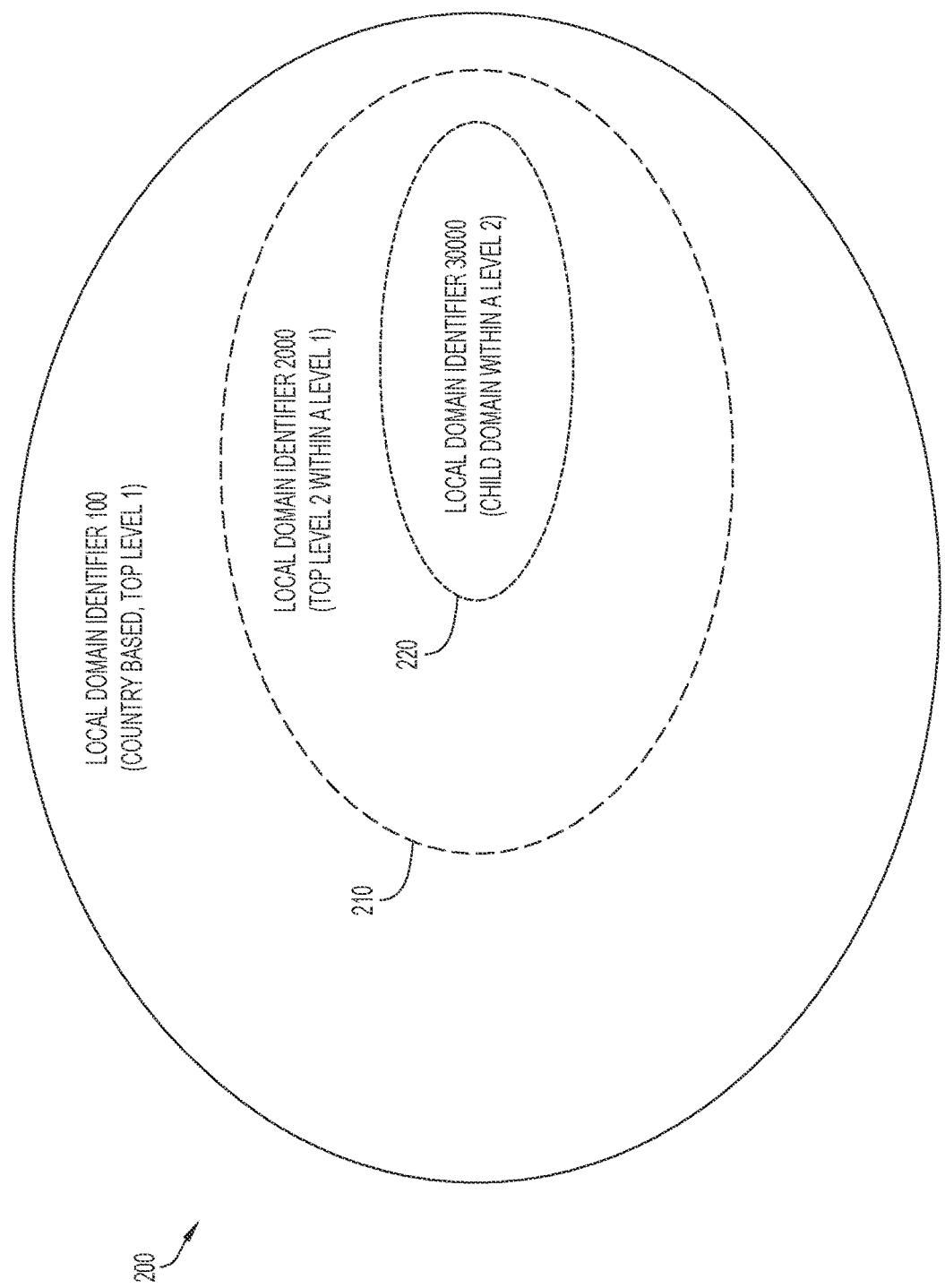
FIG. 2 illustrates an entity domain of a network environment, according to an example embodiment.

FIG. 2 illustrates an entity domain 200 of a network environment, according to an example embodiment. By way of example, entity domain 200 includes child domain 210. Entity domain 200 may correspond to a top level domain of a domain hierarchy for entity domain 200, and be assigned a local domain identifier of 100 (e.g., top level 1 for a country as shown in FIG. 2). Child domain 210 may correspond to a domain of a secondary level of the domain hierarchy subordinate to the top level domain, and be assigned a local domain identifier of 2000 (e.g., a top level 2 within a level 1 of the domain hierarchy as shown in FIG. 2). Child domain 210 includes a child domain 220. Child domain 220 may correspond to a domain of another secondary level of the domain hierarchy subordinate to the top level domain, and be assigned a local domain identifier of 30000 (e.g., child domain within a level 2 of the domain hierarchy as shown in FIG. 2). In this example case: the domain identifier for entity domain 200 may be represented as 100 (the local domain identifier since this is the top level domain of the domain hierarchy); the domain identifier for child domain 210 may be represented as 100.2000 (e.g., the top level local domain identifier 100 combined with the local domain identifier for child domain 210 to indicate the hierarchical relationship); and the domain identifier for child domain 220 may be represented as 100.2000.30000 (e.g., the top level local domain identifier 100 combined with the local domain identifiers for child domains 210, 220 to indicate the hierarchical relationship). The domain identifier may include any quantity of local domain identifiers to indicate corresponding levels of a domain hierarchy for an entity domain. The domain identifiers may correspond to prefixes for Internet Protocol (IP) or other network addresses to indicate information for specific entity and child domains in the network address. However, the domain identifiers may correspond to any portion (e.g., prefix, intermediate, suffix, etc.) of Internet Protocol (IP) or other network addresses to indicate the information for specific entity and child domains in the network address.

Figure 3:
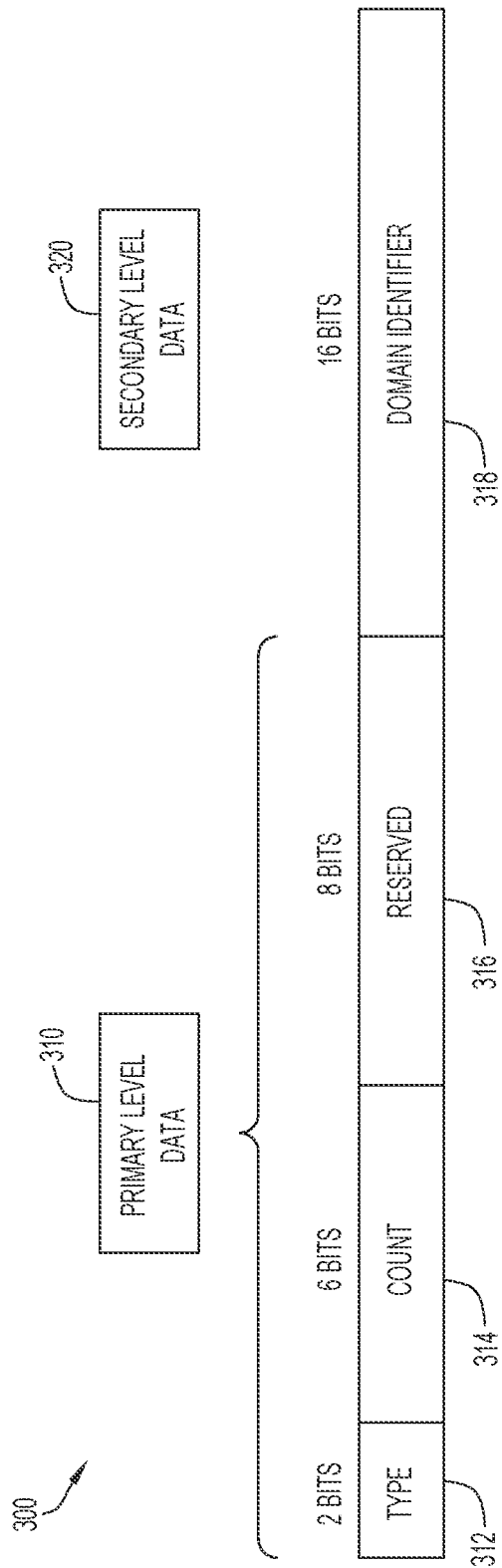
FIG. 3 illustrates a domain identifier structure, according to an example embodiment.

Routing devices 115 exchange routing information to selectively indicate the domain identifiers (and child or subordinate domains) within their corresponding domains. The routing information may be used for establishing routing tables to route packets through a network environment with awareness of the entity domains (or entities). With continued reference to FIGS. 1 and 2, FIG. 3 illustrates a domain identifier structure 300 of an example embodiment. The domain identifier structure may be used to provide a machine-readable format for transferring and processing the domain identifiers, and may be included within routing information. In the example embodiment, domain identifier structure 300 includes primary level data or code 310 and secondary level data or code 320. The primary level data is associated with information corresponding to a top level domain in a domain hierarchy for an entity domain, while the secondary level data may be linked to the primary level data and is associated with zero or more child or subordinate level domains in the domain hierarchy for the entity domain.

In an embodiment, primary level data 310 has a fixed length of 32 bits, and includes a field 312 for a domain identifier type (e.g., 2 bits), a field 314 for a count of secondary or subordinate level local domain identifiers (e.g., 6 bits), a field 316 reserved for future use (e.g., 8 bits), and a field 318 for a local domain identifier for the top level of the domain hierarchy for the entity domain (e.g., 16 bits). However, the primary level data and fields may be of any quantity or desired length, and arranged in any fashion. The domain identifier type indicates a type of domain identifier for the top level of the domain hierarchy for the entity domain. In an embodiment, initially defined values for the domain identifier type may include 0 for an entity domain (e.g., country, region, organization, enterprise, etc.), or 1 for experimental or testing purposes. The count of secondary or subordinate level local domain identifiers indicates a count or quantity of local domain identifiers for domains of secondary or subordinate levels of the domain hierarchy for the entity domain present in secondary level data 320. The domain identifier for the primary level data includes a local domain identifier for a domain at the top level of the domain hierarchy for the entity domain (e.g., the domain identifier corresponds to the local domain identifier of the entity domain). For example, a domain identifier for the primary level data may correspond to the entity of the entity domain (e.g., a country, region, organization, enterprise, etc.). The domain identifier for the primary level data is preferably mandatory, and always advertised by a routing device 115. The secondary level data 320 is optional.

In an embodiment, information of secondary level data 320, if present, includes one or more fixed 32-bit local domain identifiers of network domains at subordinate levels of the domain hierarchy for the entity domain. However, the local domain identifiers of the network domains at the secondary or subordinate levels may be of any quantity or desired length, and arranged in any fashion. The secondary level data includes a list of local domain identifiers of network domains of subordinate levels of the domain hierarchy (e.g., the local domain identifiers representing a hierarchical order (e.g., parent-child) of the domains as described above). The hierarchical nature of the domain identifier and corresponding structure provides greater scalability and better management. Filtering and summarization of domain identifiers occur at equivalent or corresponding levels of the domain hierarchy for the entity domain.

The count or quantity of local domain identifiers for domains of subordinate levels of the domain hierarchy is provided in primary level data 310 as described above. With respect to secondary level data 320, a first local domain identifier may be a local domain identifier for a top level child domain within the domain hierarchy for the entity domain. A second local domain identifier may be a local domain identifier for a domain within a subordinate level of the domain hierarchy with respect to the domain of the first local domain identifier. This pattern of relationships may be repeated within secondary level 320, where the information may include any quantity of local domain identifiers.

For example, entity domain 200 (FIG. 2) includes child domains 210, 220 as described above. Entity domain 200 may correspond to a top level domain of the domain hierarchy for entity domain 200, and be assigned local domain identifier 100. Child domain 210 may correspond to a domain of a level of the domain hierarchy subordinate to the top level domain, and be assigned local domain identifier 2000, while child domain 220 may correspond to a domain of a level of the domain hierarchy subordinate to the subordinate level domain, and be assigned local domain identifier 30000. In this example case, domain identifier structure 300 for child domain 220 (e.g., indicating the hierarchy of entity domain 200) includes primary level data 310 and secondary level data 320, where the primary level data may include: type=0 (e.g., to indicate a country), count=2 (e.g., for two levels of local domain identifiers (2000 and 30000) in the secondary level data 320), and domain identifier=100 (e.g., corresponding to a local domain identifier of 100 for the top level domain (or level 1) of the domain hierarchy corresponding to entity domain 200). Secondary level data 320 may include the local domain identifier, 2000, for child domain 210 (e.g., top level child domain of the domain hierarchy for entity domain 200) and the local domain identifier, 30000, for child domain 220 (e.g., subordinate domain of the top level child domain). Domain identifier structure 300 for the example case may be represented in hexadecimal as: primary level data 02 00 0064 (e.g., corresponding to the type (0), count (2), and local domain identifier (100) of the top level domain); and secondary level data 000007D0 00007530 (e.g., corresponding to the local domain identifiers (2000, 30000) of the secondary level domains).

The primary and secondary level data described above may be primarily used for machine processing. A human-readable or machine form may use the representation (or notation) described above (e.g., 100.2000.30000) with a convention that a local domain identifier of a topmost level (e.g., level 1) on the domain hierarchy is encoded first, followed by the child or subordinate levels. A period or other delimiter is inserted between each level of the domain hierarchy. In order to encode a list of domain identifiers that a packet (or prefix) has traversed, a comma or other delimiter may be used to separate each domain identifier. Domain identifier structure 300 may be exchanged between domain authorities 130 and routing devices 115 to assign and propagate the domain identifiers to corresponding domains in a network environment.

With continued reference to FIGS. 1-3, FIG. 4 illustrates a network environment 400 of hierarchical domains with exchange of routing information, according to an example embodiment. By way of example, network environment 400 includes entity domains 410, 415 and 425. Entity domain 410 includes child domains 420 and 430 residing therein. Child domain 420 does not include child domains, while child domain 430 includes child domains 432, 434 residing therein. Each domain 410, 415, 420, 425, 430, 432, and 434 includes at least one routing device 115, preferably located toward a border of the associated domain, to control exchange of routing information between domains. A top level domain 410, 415, 425 may represent an entity (e.g., country or other sovereignty, organization, etc.), while a child domain 420, 430, 432, 434 may represent a child entity (or sub-entity) (e.g., sub-region of a country, a functional group or unit within an organization, etc.).

Entity domain 410 may be associated with a local domain identifier of 100, while child domain 420 may be associated with a local domain identifier of 1000 and originates a prefix 'x' (e.g., corresponding to its domain identifier of 100.1000). Child domain 430 may be associated with a local domain identifier of 2000. Child domain 432 may be associated with a local domain identifier of 30000 and originates a prefix 'y' (e.g., corresponding to its domain identifier of 100.2000.30000), while child domain 434 may be associated with a local domain identifier of 40000 and originates a prefix 'z' (e.g., corresponding to its domain identifier of 100.2000.40000). The prefixes may be used for Internet Protocol (IP) or other network addresses to provide entity information.

A routing device 115 may be configured to advertise routes in various manners. The routing devices may be configured with advertisement policies to indicate conditions for performing the various advertisements. The advertisements may use domain identifier structure 300 to provide the routing information.

A routing device 115 may be configured to advertise routes outside of a local domain in various manners. For example, with respect to locally generated traffic within entity domain 410 having a local domain identifier (and domain identifier) of 100, a complete (or unfiltered) domain identifier 440 may be advertised as prefix 'y' from child domain 432 (e.g., corresponding to domain identifier 100.2000.30000) and a complete (or unfiltered) domain identifier 445 may be advertised as prefix 'z' from child domain 434 (e.g., corresponding to domain identifier 100.200.40000) to routing devices within child domain 420. Further, a complete (or unfiltered) domain identifier 450 may be advertised as prefix 'x' from child domain 420 (e.g., corresponding to domain identifier 100.1000) to child domain 430.

Alternatively, an advertisement may be filtered to advertise a portion of a domain identifier at an IP prefix level (e.g., to hide or otherwise control visibility of infrastructure within a domain for some destinations). By way of example, the local domain identifier of child domain 434 (e.g., 40000) may be removed or filtered from its domain identifier (e.g., 100.2000.40000) to only advertise the domain identifier of child domain 430 (e.g., 100.2000) for some prefixes. In this case, the domain identifier of child domain 434 (e.g., corresponding to domain identifier 100.2000.40000) is filtered to advertise prefix 'z' from child domain 434 as filtered domain identifier 455 (e.g., corresponding to domain identifier 100.2000 of child domain 430) to routing devices in child domain 420. In this case, a packet may still reach its intended destination (e.g., prefix 'z') with a filtered domain identifier policy except that the destination's detailed domain information is now hidden for this prefix (e.g., child domain 434 is hidden from domain 420 for prefix 'z'). Routing device 115 in domain 420 will have a route to prefix 'z' with domain identifier of 100.2000 and can forward packets to a routing device 115 in domain 430.

Figure 4:
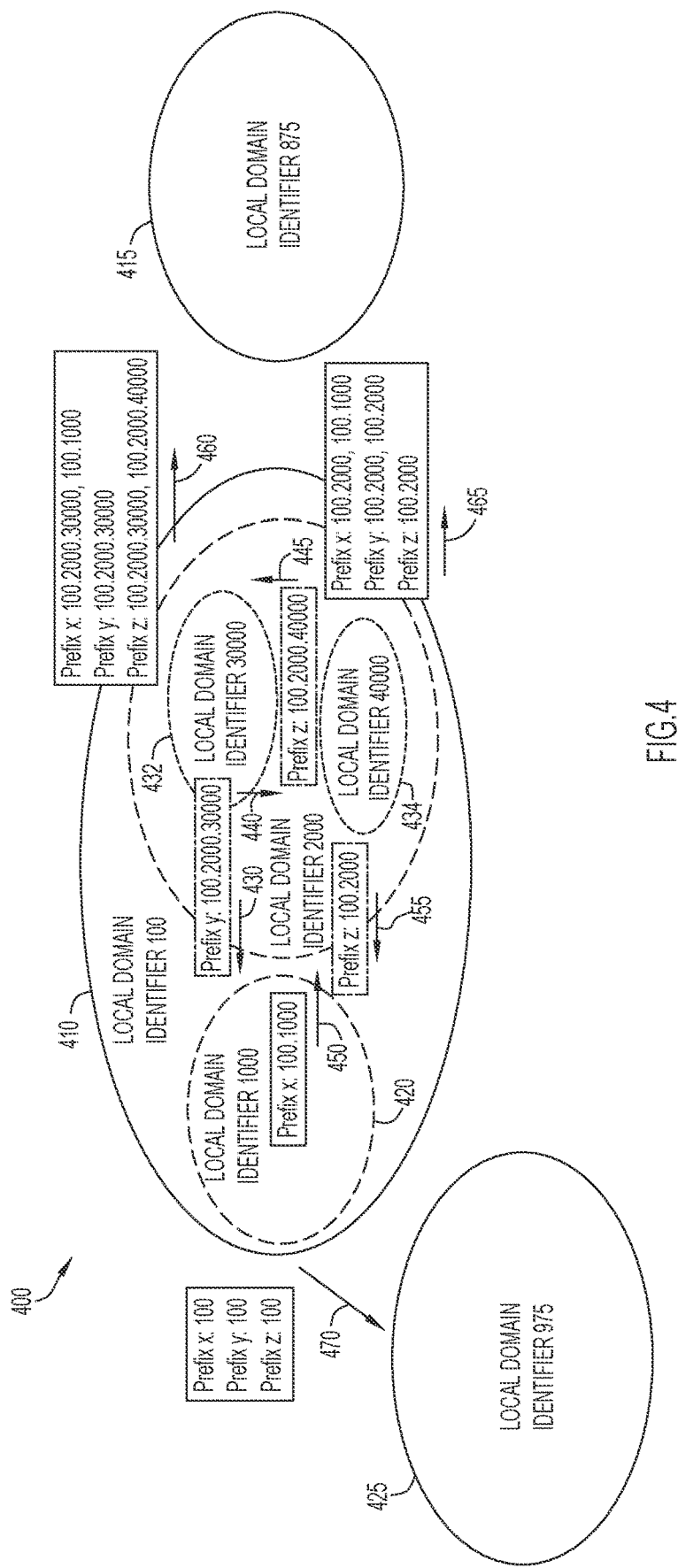
FIG. 4 illustrates a network environment including hierarchical domains with exchange of routing information, according to an example embodiment.

In certain instances, advertisements to other entity domains (e.g., different countries, organizations, etc.) may be controlled. With respect to controlling transit traffic advertisement outside of entity domain 410, a complete (or unfiltered) domain identifier list 460 may be advertised from child domain 432 (e.g., corresponding to domain identifier 100.2000.30000) to entity domain 415 (e.g., corresponding to a different entity with domain identifier 875). In this case, child domain 432 may advertise to entity domain 415 for prefix 'x' that was originated from child domain 420 to indicate a traffic route through child domain 432 (e.g., prefix 'x': 100.2000.3000, 100.1000), for prefix 'y' that was originated from child domain 432 (e.g., prefix 'y': 100.2000.30000), and for prefix 'z' that was originated from child domain 434 to indicate a traffic route through child domain 432 (e.g., prefix 'z': 100.2000.30000, 100.2000.40000). The list of domain identifiers in the advertisements may be separated by commas (as shown in FIG. 4) or other delimiters to indicate in reverse order of domains that the prefix has traversed (the most recent domain is listed first). However, the domain identifiers may be arranged in any order in the list.

Alternatively, a domain identifier of an advertisement may be filtered to advertise a portion of the domain identifier for all IP prefixes (e.g., to hide or otherwise control visibility of infrastructure of a domain). By way of example, the local domain identifiers of child domains 432, 434 (e.g., corresponding to 30000 and 40000) may be removed or filtered from domain identifiers to advertise a list 465 of filtered domain identifiers from child domain 434 to entity domain 415. In this case, child domain 434 may advertise to entity domain 415 prefix 'x' that was originated from child domain 420 with the filtered domain identifier of child domain 434 to indicate a traffic route through child domain 434 (e.g., prefix 'x': 100.2000 (with the domain identifier of child domain 434 filtered), 100.1000), prefix 'y' that was originated from child domain 432 with filtered domain identifiers of 432 and 434 (e.g., prefix 'y': 100.2000 (with the domain identifier of child domain 434 filtered), 100.2000 (with the domain identifier of child domain 432 filtered)), and prefix 'z' that was originated from child domain 434 with a filtered domain identifier (e.g., prefix 'z': 100.2000 (with the domain identifier of child domain 434 filtered)).

By way of further example, the local domain identifiers of all child domains may be removed or filtered from domain identifiers to advertise a filtered list 470. In this case, child domain 420 may advertise to entity domain 425 (e.g., corresponding to a different entity with domain identifier 975) prefix 'x' that was originated from child domain 420 and including a filtered domain identifier (e.g., prefix 'x': 100 (with the domain identifier of child domain 420 filtered)), prefix 'y' that was originated from child domain 432 with a filtered domain identifier (e.g., prefix 'y': 100 (with the domain identifiers of child domains 420, 430, and 432 filtered)), and prefix 'z' that was originated from child domain 434 with a filtered domain identifier (e.g., prefix 'z': 100 (with the domain identifiers of child domains 420, 430, and 434 filtered)).

Figure 5:
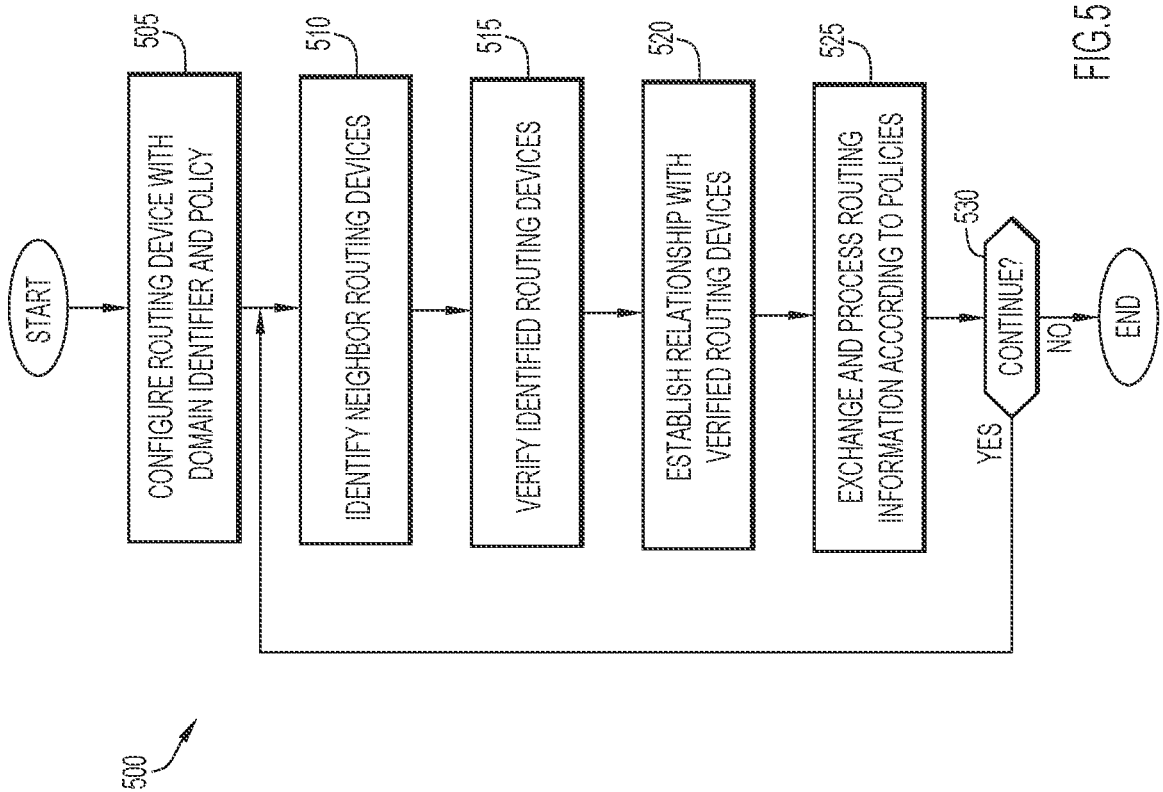
FIG. 5 illustrates a flowchart of a method to exchange routing information, according to an example embodiment.

With continued reference to FIGS. 1-4, FIG. 5 illustrates a flowchart of an example method 500 for exchanging routing information, according to an example embodiment. While the operations of FIG. 5 are described as being performed by a routing device 115, it will be appreciated that other components or network devices may additionally/alternatively perform any of these operations. A network device may be any device that is a component of, coupled to, or uses a network. For example, a network device may include a router, switch, hub, node, or other processing device.

Initially, the communication protocol of an example embodiment may be configured on a routing device 115. The communication protocol may interact with other routing protocols or processes on the routing device as described below. Routing device 115 communicates with other routing devices (of the same or different domain) to perform routing exchanges with policy control. Initially, routing device 115 is configured at operation 505 with information including a domain (and/or local) identifier for a corresponding domain and neighbor, advertisement, routing, and/or other policies. At least the advertisement and routing policies should be consistent throughout a same level of the domain hierarchy (e.g., consistent policies for child domains of the same parent domain, for the same level in the domain identifiers, etc.). The configuration information may be provided or authenticated by domain authority 130 that distributes the domain identifier information in a network environment. The policies may also be distributed by the domain authority, or downloaded to the routing device from a user or client device 125.

Once configured, routing device 115 processes information received from a network to identify neighbor routing devices at operation 510. The information may be provided by packets traversing the routing device during transit, and include data (e.g., domain identifier, etc.) indicating prior routing devices handling the packet. Identified routing devices are verified at operation 515. This may be accomplished by providing information of the identified routing devices to domain authority 130 that verifies the identified routing devices (e.g., as being entity aware, etc.) and performs a security check. The domain authorities may be hierarchical and correspond to the hierarchy of domain identifiers in order to manage and verify the domain identifiers at the corresponding level. The domain authority may compare information of an identified routing device (e.g., domain identifier of the identified routing device) to configuration information to perform the verification and security check. For example, the domain authority may ensure the identified routing device is secure based on protocols or policies (e.g., encryption, secure protocols, etc.) configured on that routing device, and/or confirm the domain identifier is a valid domain identifier based on a comparison to a list of valid domain identifiers.

When the identified routing devices are verified, a relationship is established with the identified routing devices at operation 520. This may be accomplished by the routing devices authenticating each other (e.g., via any conventional or other handshaking or other protocols, etc.). For example, the routing devices may be validated with corresponding domain authorities 130 (e.g., based on domain identifiers, etc.) to perform source verification.

Routing information (e.g., including prefixes or routes) is exchanged and processed at operation 525 in accordance with various policies (e.g., neighbor policy, advertisement policy, routing policy, etc.). A route may include an Internet Protocol (IP) or other network prefix with additional routing/path information. The routing information is exchanged with the identified routing devices for which a relationship has been established. The processing of routing information received from other routing devices includes updating a routing table based on a policy and the received information. The exchanged routing information may employ domain identifier structure 300 as described above.

In an embodiment, an entity island may be employed. The entity island is an entity domain or network that does not communicate with the outside world, but utilizes domain local only routing information beyond routing devices at an entity border. This may be achieved by the border routing devices blocking routing exchanges (e.g., via neighbor, advertisement, and/or routing policy filtering or preventing the routing exchanges for other (non-local domain) routing information, etc.). A variation is to enable a demilitarized zone (DMZ) (e.g., a subnetwork between a public Internet and private networks) for limited filtering.

In an embodiment, an entity sink may be employed. The entity sink is a special purpose entity or child domain or network. An entity sink only receives, but does not send, routing information. This may be accomplished by neighbor, advertisement, and/or routing policies. An entity sink may be used for monitoring purposes.

When additional routing devices are to be identified as determined at operation 530, the process is repeated from operation 510 in substantially the same manner described above. The determination to identify additional routing devices may be based on various conditions. For example, additional routing devices may be identified after expiration of a predetermined time interval (e.g., on a periodic or scheduled basis). Further, additional routing devices may be identified in response to receiving packets or information from the network indicating the presence of additional routing devices (e.g., packets from a routing device not previously identified or without a relationship, packets indicating a routing device not previously identified or without a relationship, etc.). The above process continues until termination as determined at operation 530.

Figure 6:
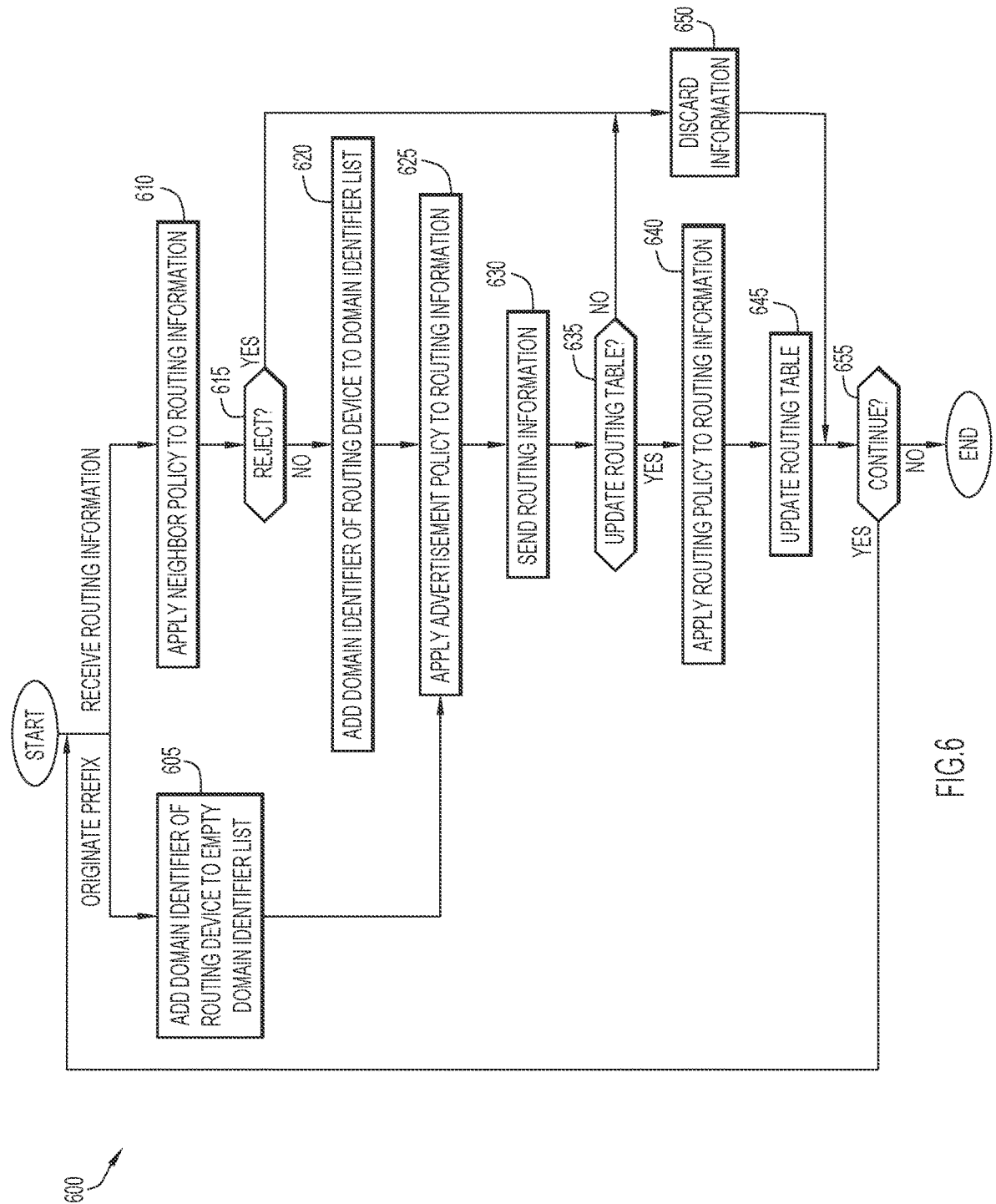
FIG. 6 illustrates a flowchart of a method to exchange and process routing information, according to an example embodiment.

With continued reference to FIGS. 1-5, FIG. 6 illustrates a flowchart of an example method 600 for exchanging and processing routing information, according to an example embodiment. This may correspond to operation 525 of FIG. 5. While the operations of FIG. 6 are described as being performed by routing device 115, it will be appreciated that other components or network devices may additionally/alternatively perform any of these operations. A network device may be any device that is a component of, coupled to, or uses a network. For example, a network device may include a router, switch, hub, node, or other processing device.

Initially, routing device 115 is configured with information including domain identifiers and various policies (e.g., neighbor, advertisement, routing, etc.) as described above. The configuration information may be provided by domain authority 130, or downloaded to the routing device from a user or client device 125 as described above. The routing device may originate a prefix (or route) and/or process routing information (e.g., prefixes or routes) received from other routing devices. A route may include an Internet Protocol (IP) or other network prefix with additional routing/path information.

When routing device 115 originates a prefix (or route), the routing device adds the domain identifier associated with the routing device to a domain identifier list at operation 605. The routing device associates its domain identifier to a prefix or route (for a network address) that the routing device originates. When a routing device 115 originates a prefix (or route), the routing device creates a new (or empty) list in which its domain identifier is added. The list provides a complete path of domain identifiers for domains, preferably in reverse order, that a route has traversed. However, the domain identifiers may be arranged in any order in the list. Domain authority 130 may authenticate the domain identifiers of the list, where hierarchical domain authorities may be employed to authenticate domain identifiers (or local domain identifiers) of a corresponding level of a domain hierarchy. The list is associated with a prefix and provides an indication of the specific entities and child entities (or sub-entities) through which the route has traversed. This information may be used to track and filter routing information for auditing or generating reports.

When routing device 115 receives routing information (e.g., prefix or route) from another routing device, a neighbor policy is applied to the received routing information at operation 610. When a relationship is established with another routing device, the relationship basically enables exchange of routing information. However, a corresponding neighbor policy is associated with each neighbor (or related) routing device to control the exchange of information with that neighbor routing device (e.g., the information to send or withhold, the information to receive from the neighbor routing device, routing information to discard, avoid sending routing information received from the neighbor routing device back to that neighbor routing device, etc.). The neighbor policy indicates conditions and corresponding actions to perform for exchanging the routing information (e.g., prefixes or routes) with the corresponding neighbor routing device. The neighbor policy may include various rules indicating one or more conditions and one or more corresponding actions to perform for exchanging the routing information. For example, a rule may specify to withhold certain information from being exchanged with the neighbor routing device. In this case, the rule may specify the certain information in the routing information as a condition, and indicate the action to remove the certain information. The routing information is processed according to the actions of the rule to provide and/or receive the appropriate routing information.

By way of further example, the neighbor policy may indicate an exclude list. In this case, the exclude list indicates a list of domains (or domain identifiers) to reject. A domain (or routing device) may reject all routes from domains indicated on the exclude list. This may be accomplished by identifying the prefixes or domain identifiers in the received routing information and comparing the identified prefixes to the exclude list. When the domain identifier or prefix exists on the exclude list, the prefix (or received routing information) is to be rejected or discarded. The neighbor policy may include various rules indicating one or more conditions and one or more corresponding actions to perform for accepting or rejecting routes. By way of example, a rule may specify that all routes are to be rejected including certain entities or domains within the network (e.g., certain countries or organizations, certain states of countries or units of organizations, etc.) in order to comply with data requirements. In this case, the rule may specify the certain domains (or domain identifiers) as the conditions, and indicate the action is to discard the received routing information containing the certain domains.

When routing information (e.g., prefix or route) received from another routing device is to be rejected as determined at operation 615, the routing information is rejected or discarded at operation 650. The rejection of the route may be determined in accordance with a neighbor policy as described above.

When the received route is to be accepted as determined at operation 615, routing device 115 adds the domain identifier associated with the routing device to the received routing information (e.g., prefix or route) at operation 620. When a routing device 115 advertises its routes to other routing devices with which it has built relationships, it pre-pends its own domain identifier to an existing list of domain identifiers within the received routing information. The list provides a complete path of domain identifiers for domains, preferably in reverse order, that a route has traversed. However, the domain identifiers may be arranged in any order in the list. Domain authority 130 may authenticate the domain identifiers of the list, where hierarchical domain authorities may be employed to authenticate domain identifiers (or local domain identifiers) of a corresponding level of a domain hierarchy. The list is associated with a prefix and provides an indication of the specific entities and child entities (or sub-entities) through which the route has traversed. This information may be used to track and filter routing information for auditing or generating reports.

Once routing information is produced for exchange with other routing devices (e.g., an originated prefix from operation 605 or updated routing information from operation 620), an advertisement policy is applied to the routing information by routing device 115 at operation 625 to produce routing information (e.g., prefixes or routes) for exchange with other routing devices. The routing information preferably includes prefixes for IP or other network addresses, where the prefixes include one or more domain identifiers. The routing information may employ domain identifier structure 300 described above for conveying prefixes (or domain identifiers). The domain identifiers may be summarized or aggregated at a routing device of an entity border (e.g., a routing device communicating external of its corresponding domain, etc.). When additional hierarchy is defined under secondary level data 320 of domain identifier structure 300, additional summarization or aggregation can take place at each hierarchical level. For example, the lists for exchange or advertisement (e.g., lists 460, 465, and 470 of FIG. 4) may be prepared at the border routing device.

The advertisement policy indicates conditions and corresponding actions to perform for advertising the routing information (e.g., prefixes or routes) to the identified routing devices. The advertisement policy may include various rules indicating one or more conditions and one or more corresponding actions to perform for advertising the routing information. For example, a rule may specify to filter or remove child domains from domain identifiers (or prefixes) being exchanged with routing devices of certain domains (e.g., certain countries or organizations, etc.) in order to hide internal domain infrastructure. In this case, the rule may specify the certain domains (or corresponding domain identifiers) as the conditions, and indicate the action to filter or remove the child domains from the domain identifiers (or prefixes) being exchanged. The routing information to be exchanged is processed according to the actions of the rule to provide the filtered domain identifiers (or prefixes) of the routing information.

The resulting routing information produced from the advertisement policy is exchanged with other routing devices at operation 630 in accordance with the policies for the neighbor routing devices.

Routing information (e.g., prefixes or routes) received from other routing devices is used to produce or update routes for a routing table for routing data through the network. The routing table basically includes information to route a packet to a next hop (or routing device) toward an intended destination. A routing policy is applied to combine or aggregate routing information received from neighbor routing devices (e.g., indicate which routing information has priority (e.g., most recent information, closest neighbor routing device, etc.)). The routing policy may include various rules indicating one or more conditions and one or more corresponding actions to perform. The rules may indicate priority for routing information (e.g., for discarding routing information of lesser priority, etc.), and/or certain entities or domains to avoid within the network (e.g., certain countries or organizations, certain states of countries or units of organizations, etc.). For example, routes with a prefix for the certain entities or domains are discarded and prevented from being inserted in the routing table (when the prefix or route has not yet been installed in the routing table). When a route is to be discarded (e.g., not used for updating the routing table) as determined at operation 635, the route is discarded at operation 650.

When a route is to be accepted for updating the routing table as determined at operation 635, the routing policy is applied to the route at operation 640 for compliance with data sovereignty and/or other requirements. In other words, when a route is to be installed in the routing table, an additional operation is performed to check for data sovereignty and or other compliance based on the routing policy. The routing policy may include various rules indicating one or more conditions and one or more corresponding actions to perform for modifying routes of the routing table. For example, a rule may specify that data is to avoid certain entities or domains within the network (e.g., certain countries or organizations, certain states of countries or units of organizations, etc.) in order to comply with data requirements. In this case, the rule may specify the certain domains (or domain identifiers) as the conditions, and indicate the action to modify or remove routes in the routing table including those certain domains.

The routing table is updated at operation 645 in accordance with the applied routing policy (e.g., entity compliance checking, etc.). For example, routes with a prefix (or domain identifier) that does not comply with the routing policy are removed from the routing table (when the prefix or route has been previously installed in the routing table). After updating the routing table at operation 645, or discarding routing information at operation 650, the above process may be repeated to originate a prefix or process received routing information in substantially the same manner described above. The above process continues until termination as determined at operation 655. The origination of a prefix and processing of received routing information may be performed in parallel or concurrently (e.g., originate a prefix while receiving and processing routing information). The resulting routing information to be exchanged may include the originated prefix, updated routing information, or any combination thereof.

The communication protocol of an example embodiment may interact with other protocols or processes on routing device 115 or other devices. For example, the Border Gateway Protocol (BGP) may be extended by an add-on providing the entity aware communication protocol of an example embodiment. Additional entity domain information may be provided to a BGP decision process to prefer or avoid a particular path when multiple paths exist. BGP may be enhanced to filter based on the prefix or domain identifier list. When an autonomous system (AS) of BGP crosses entity boundaries, re-architecture or migration may be required to re-align with the entity requirement.

By way of example, the Border Gateway Protocol (BGP) may be executing on a same or different routing device as the communication protocol of the example embodiment. In this case, when BGP is enhanced for interaction with the communication protocol, BGP may call the communication protocol to perform a compliance check before inserting routes into the routing table (e.g., similar to operation 640 described above).

Alternatively, the communication protocol of the example embodiment may be executing independently of the Border Gateway Protocol (BGP), where the communication protocol is made as part of the routing table update process. For example, whenever a new BGP route is to be inserted into the routing table, the route is processed by the compliance check of the communication protocol prior to the insertion (e.g., similar to operation 640 described above).

In addition, the communication protocol of an example embodiment may be used with the Interior Gateway Protocol (IGP). In this case, since IGP is of a flooding nature, one IGP instance is preferably contained within one entity domain or child domain. However, an entity domain or child domain may include more than one IGP instance.

With respect to the data plane, a route may be selected from the routing table to route a packet through the network. Since the routing table has been modified according to a routing policy as described above, the routes in the routing table should comply with data sovereignty or other requirements. The route may be selected based on various criteria (e.g., shortest route, fastest route, domain selection criteria (e.g., use or avoid certain entities or child entities, etc.), etc.). In addition, the prefixes may be placed in a packet during transit to provide a path of the packet through the entities and sub-entities for auditing or generating reports.

Figure 7:
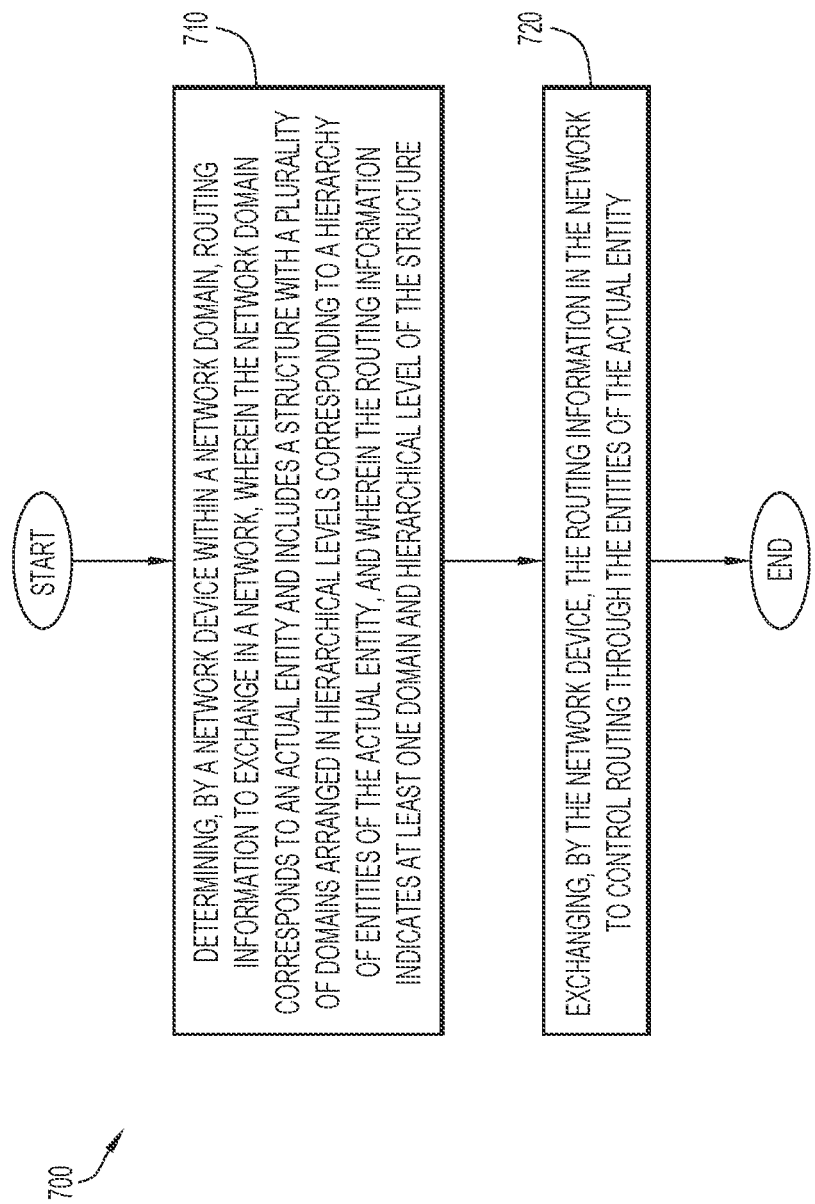
FIG. 7 illustrates a flowchart of a generalized method for routing based on hierarchical domains in a network environment, according to an example embodiment.

FIG. 7 is a flowchart of an example method 700 for routing based on hierarchical domains in a network environment, according to an example environment. At operation 710, a network device within a network domain determines routing information to exchange in a network. The network domain corresponds to an actual entity and includes a structure with a plurality of domains arranged in hierarchical levels corresponding to a hierarchy of entities of the actual entity. The routing information indicates at least one domain and hierarchical level of the structure. At operation 720, the network device exchanges the routing information in the network to control routing through the entities of the actual entity.

Figure 8:
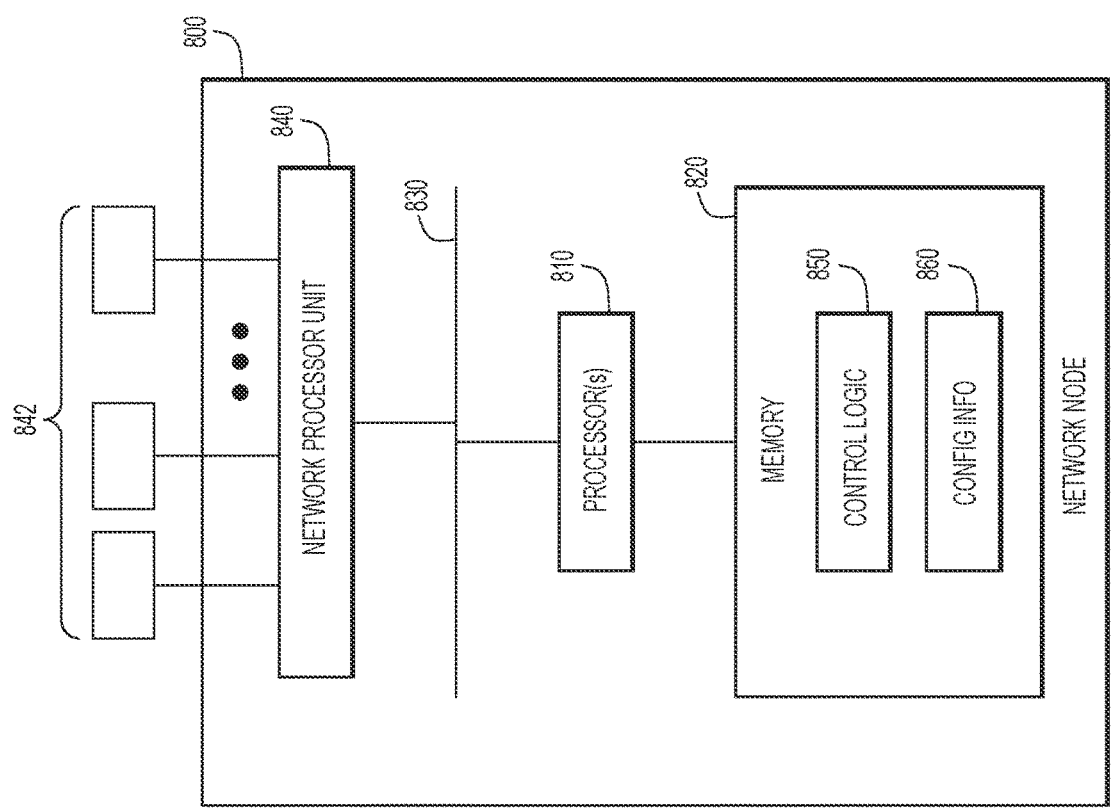
FIG. 8 illustrates a block diagram of a network device, according to an example embodiment.

Reference is now made to FIG. 8. FIG. 8 illustrates a block diagram of a network element (node) 800 configured to perform the operations described above and depicted in connection with FIGS. 1-7. The network node may implement routing device 115, computing device 125 (e.g., serving as a network device), and domain authority 130. The network node 800 includes one or more control processors 810, memory 820, a bus 830 and a network processor unit 840. The control processor 810 may be a microprocessor or microcontroller. The network processor unit 840 may include one or more Application Specific Integrated Circuits (ASICs), linecards, etc., and facilitates network communications between the node 800 and other network nodes.

There are a plurality of network ports 842 at which the node 800 receives packets and from which the node 800 sends packets into the network. The processor 810 executes instructions associated with software stored in memory 820. Specifically, the memory 820 stores instructions for control logic 850 that, when executed by the processor 810, causes the processor 810 to perform various operations on behalf of the node 800 as described herein. The memory 820 also stores configuration information 860 to configure the network node according to desired network functions. It should be noted that in some embodiments, the control logic 850 may be implemented in the form of firmware implemented by one or more ASICs as part of the network processor unit 840.

The memory 820 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 820 may comprise one or more tangible (non-transitory) computer readable storage media (e.g., a memory device) encoded with software comprising computer executable instructions and when the software is executed (by the processor 810) it is operable to perform certain network node operations described herein.

Figure 9:
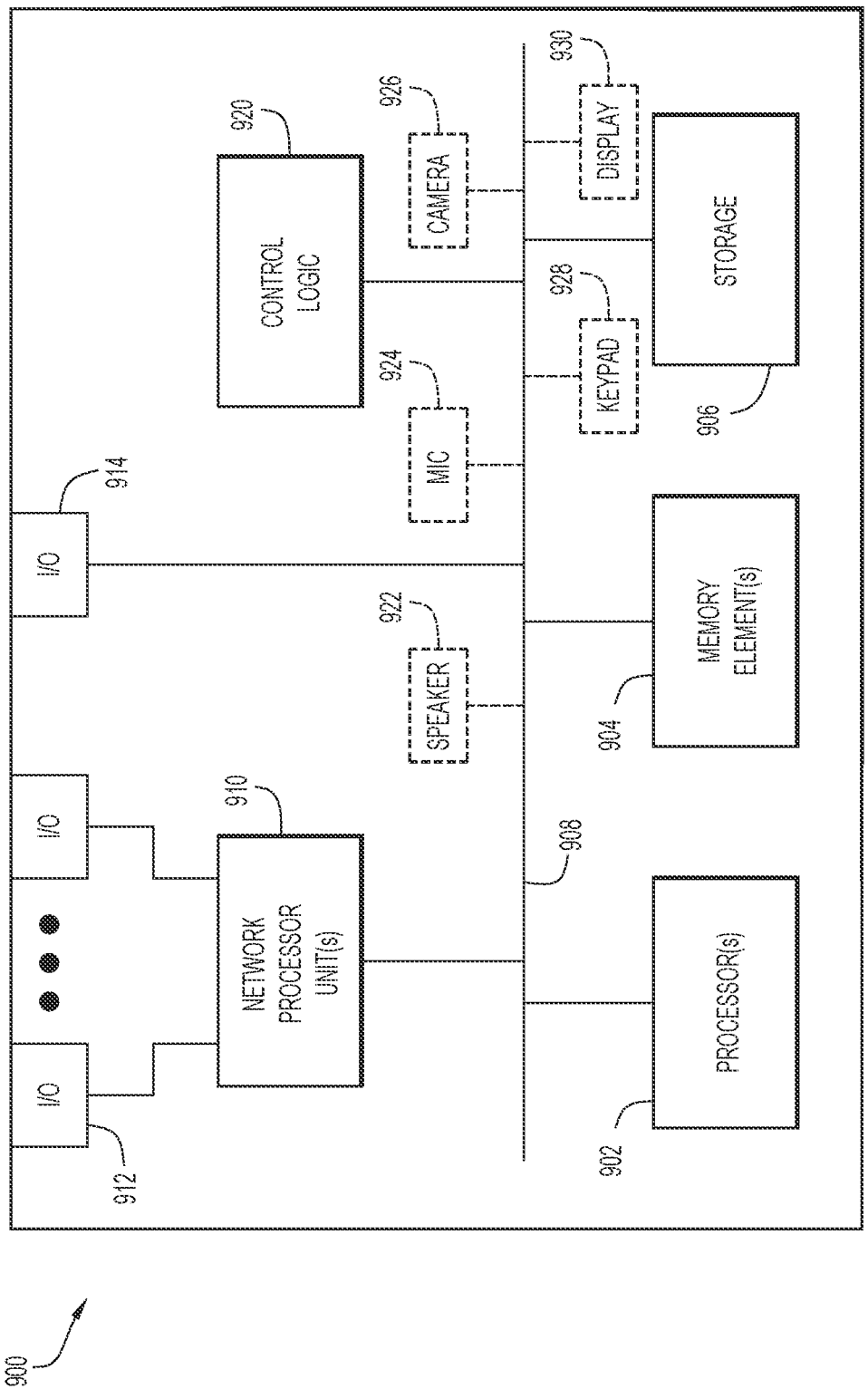
FIG. 9 illustrates a hardware block diagram of a computing device, according to an example embodiment.

Referring to FIG. 9, FIG. 9 illustrates a hardware block diagram of a computing device 900 that may perform functions associated with operations discussed herein in connection with the techniques depicted in FIGS. 1-7. In various embodiments, a computing device or apparatus, such as computing device 900 or any combination of computing devices 900, may be configured as any device entity/entities (e.g., computing devices 125 (e.g., serving as end-user or client devices, etc.), domain authorities 130, etc.) as discussed for the techniques depicted in connection with FIGS. 1-7 in order to perform operations of the various techniques discussed herein.

In at least one embodiment, computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, device entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other device entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain device entities (e.g., computing device 125 (e.g., serving as an end-user or client device, etc.), computing device 900 may further include, or be coupled to, an audio speaker 922 to convey sound, microphone or other sound sensing device 924, camera or image capture device 926, a keypad or keyboard 928 to enter information (e.g., alphanumeric information, etc.), and/or a touch screen or other display 930. These items may be coupled to bus 908 or I/O interface(s) 914 to transfer data with other elements of computing device 900.

In various embodiments, control logic 920 can include instructions that, when executed, cause processor(s) 902 to perform operations, which can include, but not be limited to, providing overall control operations of computing device 900; interacting with other device entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs, software, and services described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, network devices or nodes, etc.) and databases or other repositories arranged in any desired fashion, where the present embodiments may be applied to any desired type of computing or networking environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various computing and network devices, and other processing systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computing, network, or other processing devices of the present embodiments may include any conventional or other communications devices to communicate over the network via any conventional or other protocols. The computing, network, or other processing devices may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device or apparatus described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) and/or storage can store data, software, code, instructions (e.g., processor instructions), logic, parameters, combinations thereof, and/or the like used for operations described herein. This includes the memory elements and/or storage being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11

(e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among device entities that may directly or indirectly be connected utilizing any algorithms, communication protocols, interfaces, etc. (proprietary and/or non-proprietary) that allow for the exchange of data and/or information.

In various example implementations, any device entity, network entity, or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Any Internet Protocol (IP) addresses discussed herein can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: determining, by a network device within a network domain, routing information to exchange in a network, wherein the network domain corresponds to an actual entity and includes a structure with a plurality of domains arranged in hierarchical levels corresponding to a hierarchy of entities of the actual entity, and wherein the routing information indicates at least one domain and hierarchical level of the structure; and exchanging, by the network device, the routing information in the network to control routing through the entities of the actual entity.

In one example, the domains are assigned identifiers indicating paths of the domains through the hierarchical levels, and the identifiers correspond to prefixes for network addresses.

In one example, an identifier for a corresponding domain is represented by a data structure including first data for a domain in a top level of the hierarchical levels, and second data linked to the first data and indicating one or more domains in at least one secondary level of the hierarchical levels according to a path of the corresponding domain.

In one example, the determining and exchanging of the routing information is performed in accordance with a communication protocol at a network layer.

In one example, the actual entity includes one of a sovereignty and an organization.

In one example, the method further comprises filtering, by the network device, the at least one domain of the routing information to control visibility of the structure of the network domain.

In one example, the method further comprises inserting in network traffic, by the network device, an identifier to indicate a corresponding entity traversed by the network traffic.

In one example, a policy specifies one or more domains of the network to avoid for compliance with data requirements, and the method further comprises modifying, by the network device, a routing table to provide routes in accordance with the policy.

In another form, an apparatus is provided. The apparatus comprises: a network device within a network domain and including one or more processors, wherein the one or more processors are configured to: determine routing information to exchange in a network, wherein the network domain corresponds to an actual entity and includes a structure with a plurality of domains arranged in hierarchical levels corresponding to a hierarchy of entities of the actual entity, and wherein the routing information indicates at least one domain and hierarchical level of the structure; and exchange the routing information in the network to control routing through the entities of the actual entity.

In another form, one or more non-transitory computer readable storage media are provided. The non-transitory computer readable storage media are encoded with processing instructions that, when executed by one or more processors of a network device within a network domain, cause the one or more processors of the network device to: determine routing information to exchange in a network, wherein the network domain corresponds to an actual entity and includes a structure with a plurality of domains arranged in hierarchical levels corresponding to a hierarchy of entities of the actual entity, and wherein the routing information indicates at least one domain and hierarchical level of the structure; and exchange the routing information in the network to control routing through the entities of the actual entity.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   determining, by a network device within a network domain, routing information to exchange in a network, wherein the network domain corresponds to an actual entity and includes a structure with the network domain and a plurality of child domains within the network domain arranged in hierarchical levels corresponding to a hierarchy of entities of the actual entity, wherein each child domain of a lower hierarchical level is included within a corresponding parent domain of an upper hierarchical level, wherein a child domain of the structure is indicated to external domains of the network domain by a domain identifier including a local domain identifier of the child domain and local domain identifiers of one or more parent domains in upper hierarchical levels of the structure within a path to the child domain, wherein the routing information includes a plurality of domain identifiers that indicates two or more child domains of the structure, wherein the actual entity corresponds to a geographic region and the network domain is geographically aligned with boundaries of the geographic region, and wherein the plurality of child domains each correspond to a sub-region of the geographic region and are aligned geographically with the sub-region;
   filtering, by the network device, the two or more child domains of the routing information to remove at least one child domain and control visibility of the structure of the network domain, wherein at least one domain identifier remains in the routing information that indicates one or more child domains of the structure;
   exchanging, by the network device, the routing information with the external domains in the network to control routing from the external domains through the geographic region by avoiding at least one specified sub-region according to a data requirements policy indicating one or more sub-regions to avoid for compliance with data requirements; and
   modifying, by the network device, a routing table to provide routes in accordance with the data requirements policy by removing the routes in the routing table with local domain identifiers corresponding to the one or more sub-regions to avoid.

2. The method of claim 1, wherein the plurality of child domains are assigned identifiers indicating paths of the plurality of child domains through the hierarchical levels, and the identifiers correspond to prefixes for network addresses.

3. The method of claim 2, wherein an identifier for a corresponding domain is represented by a data structure including first data for a domain in a top level of the hierarchical levels, and second data linked to the first data and indicating one or more child domains in at least one secondary level of the hierarchical levels according to a path of the corresponding domain.

4. The method of claim 1, wherein determining and exchanging of the routing information is performed in accordance with a communication protocol at a network layer.

5. The method of claim 1, wherein the actual entity includes a sovereignty.

6. The method of claim 1, wherein the actual entity includes a country.

7. The method of claim 1, further comprising:
inserting in network traffic, by the network device, an identifier to indicate a corresponding entity traversed by the network traffic.

8. The method of claim 6, wherein the sub-region includes a state, province, city, town, or neighborhood.

9. An apparatus comprising:
a network device within a network domain and including one or more processors, wherein the one or more processors are configured to perform operations including:
determining routing information to exchange in a network, wherein the network domain corresponds to an actual entity and includes a structure with the network domain and a plurality of child domains within the network domain arranged in hierarchical levels corresponding to a hierarchy of entities of the actual entity, wherein each child domain of a lower hierarchical level is included within a corresponding parent domain of an upper hierarchical level, wherein a child domain of the structure is indicated to external domains of the network domain by a domain identifier including a local domain identifier of the child domain and local domain identifiers of one or more parent domains in upper hierarchical levels of the structure within a path to the child domain, wherein the routing information includes a plurality of domain identifiers that indicates two or more child domains of the structure, wherein the actual entity corresponds to a geographic region and the network domain is geographically aligned with boundaries of the geographic region, and wherein the plurality of child domains each correspond to a sub-region of the geographic region and are aligned geographically with the sub-region;
filtering the two or more child domains of the routing information to remove at least one child domain and control visibility of the structure of the network domain, wherein at least one domain identifier remains in the routing information that indicates one or more child domains of the structure;
exchanging the routing information with the external domains in the network to control routing from the external domains through the geographic region by avoiding at least one specified sub-region according to a data requirements policy indicating one or more sub-regions to avoid for compliance with data requirements; and
modifying a routing table to provide routes in accordance with the data requirements policy by removing the routes in the routing table with local domain identifiers corresponding to the one or more sub-regions to avoid.

10. The apparatus of claim 9, wherein the plurality of child domains are assigned identifiers indicating paths of the plurality of child domains through the hierarchical levels, and the identifiers correspond to prefixes for network addresses, and wherein an identifier for a corresponding domain is represented by a data structure including first data for a domain in a top level of the hierarchical levels, and second data linked to the first data and indicating one or more child domains in at least one secondary level of the hierarchical levels according to a path of the corresponding domain.

11. The apparatus of claim 9, wherein determining and exchanging of the routing information is performed in accordance with a communication protocol at a network layer, and the actual entity includes a sovereignty.

12. The apparatus of claim 9, wherein the actual entity includes a country.

13. The apparatus of claim 9, wherein the one or more processors are configured to perform further operations including:
inserting in network traffic an identifier to indicate a corresponding entity traversed by the network traffic.

14. The apparatus of claim 12, wherein the sub-region includes a state, province, city, town, or neighborhood.

15. One or more non-transitory computer readable storage media encoded with processing instructions that, when executed by one or more processors of a network device within a network domain, cause the one or more processors of the network device to perform operations including:
determining routing information to exchange in a network, wherein the network domain corresponds to an actual entity and includes a structure with the network domain and a plurality of child domains within the network domain arranged in hierarchical levels corresponding to a hierarchy of entities of the actual entity, wherein each child domain of a lower hierarchical level is included within a corresponding parent domain of an upper hierarchical level, wherein a child domain of the structure is indicated to external domains of the network domain by a domain identifier including a local domain identifier of the child domain and local domain identifiers of one or more parent domains in upper hierarchical levels of the structure within a path to the child domain, wherein the routing information includes a plurality of domain identifiers that indicates two or more child domains of the structure, wherein the actual entity corresponds to a geographic region and the network domain is geographically aligned with boundaries of the geographic region, and wherein the plurality of child domains each correspond to a sub-region of the geographic region and are aligned geographically with the sub-region;
filtering the two or more child domains of the routing information to remove at least one child domain and control visibility of the structure of the network domain, wherein at least one domain identifier remains in the routing information that indicates one or more child domains of the structure;
exchanging the routing information with the external domains in the network to control routing from the external domains through the geographic region by avoiding at least one specified sub-region according to a data requirements policy indicating one or more sub-regions to avoid for compliance with data requirements; and
modifying a routing table to provide routes in accordance with the data requirements policy by removing the routes in the routing table with local domain identifiers corresponding to the one or more sub-regions to avoid.

16. The one or more non-transitory computer readable storage media of claim 15, wherein the plurality of child domains are assigned identifiers indicating paths of the plurality of child domains through the hierarchical levels, and the identifiers correspond to prefixes for network addresses, and wherein an identifier for a corresponding domain is represented by a data structure including first data for a domain in a top level of the hierarchical levels, and second data linked to the first data and indicating one or more child domains in at least one secondary level of the hierarchical levels according to a path of the corresponding domain.

17. The one or more non-transitory computer readable storage media of claim 15, wherein determining and exchanging of the routing information is performed in accordance with a communication protocol at a network layer, and the actual entity includes a sovereignty.

18. The one or more non-transitory computer readable storage media of claim 15, wherein the actual entity includes a country.

19. The one or more non-transitory computer readable storage media of claim 15, wherein the processing instructions cause the one or more processors of the network device to perform further operation including:
   inserting in network traffic an identifier to indicate a corresponding entity traversed by the network traffic.

20. The one or more non-transitory computer readable storage media of claim 18, wherein the sub-region includes a state, province, city, town, or neighborhood.

* * * * *